United States Patent  [10] Patent No.: US 8,342,446 B2
Chareyre et al.  (45) Date of Patent: Jan. 1, 2013

(54) AIRPLANE WITH A MODIFIABLE SURFACE OF VERTICAL EMPANNAGE

(75) Inventors: Philippe Chareyre, La Salvetat Saint Gilles (FR); Thierry Druot, Saint Jean (FR); Olivier Cazals, Daux (FR)

(73) Assignee: Airbus Operations SAS, Toulouse (FR)

( * ) Notice: Subject to any disclaimer, the term of this patent is extended or adjusted under 35 U.S.C. 154(b) by 657 days.

(21) Appl. No.: 12/499,907

(22) Filed: Jul. 9, 2009

(65) Prior Publication Data
US 2010/0032519 A1  Feb. 11, 2010

(30) Foreign Application Priority Data
Jul. 16, 2008 (FR) .................................. 08 54828

(51) Int. Cl.
*B64C 5/12* (2006.01)
*B64C 5/10* (2006.01)
*B64C 9/02* (2006.01)
(52) U.S. Cl. ........................................... 244/87; 244/91
(58) Field of Classification Search .................. 244/87, 244/88, 91
See application file for complete search history.

(56) References Cited

U.S. PATENT DOCUMENTS

| 1,313,839 | A | * | 8/1919 | Strom | 244/88 |
| 2,257,940 | A | * | 10/1941 | Dornier | 244/53 R |
| 2,559,827 | A | * | 7/1951 | Northrop | 244/91 |
| 2,580,176 | A | * | 12/1951 | Johnson | 244/87 |
| 2,744,698 | A | | 5/1956 | Baynes | |
| 2,999,657 | A | | 9/1961 | Clark | |
| 3,025,027 | A | * | 3/1962 | Ferreira | 244/91 |
| 3,442,472 | A | * | 5/1969 | Kalina | 244/87 |
| 3,826,448 | A | * | 7/1974 | Burk, Jr. | 244/91 |
| 5,150,861 | A | * | 9/1992 | Merkel et al. | 244/91 |
| 5,681,010 | A | | 10/1997 | Jensen | |
| 8,006,932 | B2 | * | 8/2011 | Honorato Ruiz et al. | 244/87 |
| 2007/0267541 | A1 | * | 11/2007 | Honorato Ruiz et al. | 244/87 |

FOREIGN PATENT DOCUMENTS

JP 02028099 A * 1/1990
JP 05069894 A * 3/1993

OTHER PUBLICATIONS

Patent Abstracts of Japan, Publication 02 028099 A, Mitsubishi Heavy Ind. Ltd., Jan. 30, 1990.

* cited by examiner

*Primary Examiner* — Joseph W Sanderson
(74) *Attorney, Agent, or Firm* — Perman & Green, LLP

(57) ABSTRACT

An aircraft has a vertical fin fastened to the rear and above a fuselage of elongated form, essentially in a vertical plane of symmetry of the aircraft. The vertical fin has at least two stable positions, an extended position and a returned position, such that a surface of the vertical fin, subjected to an aerodynamic flow when the aircraft is in flight, is modified in position or in surface between the returned position and the extended position, so that the aerodynamic drag of the vertical fin is reduced in the returned position under given flight conditions compared to the extended position. The change from one surface to another of the vertical fin is accomplished by modifying the geometry of the vertical fin or by displacing the vertical fin relative to the fuselage so that the vertical fin, for example, is more or less inside the fuselage, or more or less immersed in the wake zone of the fuselage in which the local dynamic pressure Pd is reduced relative to the infinitely upstream dynamic pressure Pd0.

13 Claims, 6 Drawing Sheets

AIRPLANE WITH A MODIFIABLE SURFACE OF VERTICAL EMPANNAGE

CROSS-REFERENCE TO RELATED APPLICATIONS

This application claims priority to and the benefit of French Application No. 08 54828 filed on 16 Jul. 2008, the disclosure of which is incorporated herein by reference in its entirety.

BACKGROUND

1. Field

This invention relates to the field of aircraft such as civil transport aircraft.

More particularly, the invention relates to an aircraft that has at least one vertical fin fastened to the fuselage in a rear area of the fuselage, the geometric configuration of which is modified to reduce drag while cruising.

2. Brief Description of Related Developments

Modern transport aircraft, in particular civil passenger transport aircraft, at least for the most widely used aerodynamic architectures, have a group of fins fastened at the rear of a main aircraft structure that itself includes a vertical fin, most often fastened to the fuselage and above it, essentially in a vertical plane of symmetry of the aircraft.

The vertical fin has a dual role.

On the one hand, by virtue of the aerodynamic forces that it generates on the aircraft, the vertical fin assures a natural directional stability of the aircraft.

This directional stability is due to the restoring torque Cn around a vertical axis Z of a conventional aircraft configuration when the aircraft is subjected to an aerodynamic sideslip $\beta$, in other words the aerodynamic coefficient $Cn\beta=dCn\beta/d\beta$ is negative and tends to cancel the sideslip. The torque Cn originates from a lateral lift along Y of the vertical fin when the aerodynamic sideslip $\beta$ is not zero.

On the other hand, by means of a directional rudder, in other words an aerodynamic surface hinged to the trailing edge of the vertical fin, the vertical fin is able to generate a yawing torque that is a function of the setting of the directional rudder, proportional to a first approximation to the angle of the rudder setting.

This rudder is used to direct the aircraft when the flight conditions are not symmetrical on the aerodynamic level.

Such asymmetric flight situations are encountered when the aircraft is subjected to lateral aerodynamic flow, for example in the presence of gusts of wind that have a horizontal component and especially when the aircraft is in a dissymmetric propulsive engine thrust configuration, essentially in case of an engine breakdown.

In these asymmetric configurations, a more or less durable action on the directional rudder is necessary to assure the control of the aircraft in flight or on the ground, and the efficacy of the control depends on the dimensions in particular of the reference aerodynamic surfaces of the vertical fin and of its rudder, as well as on the geometry of the fin following the known effects of parameters such as elasticity, deflection, or others.

In practice, the aerodynamic forces generated by the vertical fin are directly proportional to the dynamic pressure Pd of the aerodynamic flow, in other words it is a function of the square of the airspeed of the aircraft: $Pd=\frac{1}{2}\rho V^2$, $\rho$ being the density of the air at the point of flight under consideration, and V being the relative speed between the aircraft and the flow.

In practice, the dimensions of the vertical fin, both of its fixed part and of its rudder, are most often established for the most unfavorable flight conditions, in other words at low speed when the dynamic pressure Pd is low and when the dissymmetry of flight is at a maximum, which occurs in general when the thrust of the engines is maximal with failure of an engine off center relative to the plane of symmetry of the aircraft, with the ability of the aircraft to control its trajectory then defining a minimum control speed VMC, The summation of these two condition (low dynamic pressure and dissymmetry) is encountered effectively in case of an engine failure during a low-speed phase of flight, at takeoff or when restoring gas on approach, in flight or on the ground during an acceleration, when the speed no longer assures the lateral control of the aircraft by acting on the wheels, and taking this critical condition into account imposes a vertical fin of large dimensions even though when the speed is higher than during the takeoff or approach phases, a vertical fin of relatively smaller dimensions would be sufficient to assure correct directional stability.

The vertical fins of current aircraft accordingly have dimensions determined for critical conditions that concern only a limited period of the flight of an aircraft, and have dimensions greater than those needed for the longer period of flight, which is penalized in particular considering a traversed surface of no use in the aerodynamic flow, that generates aerodynamic drag.

SUMMARY

The aspects of the disclosed embodiments generally propose a vertical fin that respects the exigencies of controlling the aircraft at low speed and whose position can be modified depending on the flight conditions to avoid penalizing the aerodynamic drag by a vertical fin that is uselessly effective during high-speed phases of flight, in particular when cruising.

To this end, an aircraft has a fuselage with a shape elongated along a longitudinal direction X of an aircraft frame of reference, on which is fastened a vertical fin in a rear section of the fuselage relative to the direction of motion of the aircraft in flight and above the said fuselage, essentially in a vertical plane of symmetry of the aircraft.

The vertical fin has at least one mobile part with at least two stable positions, called the extended position and the returned position, such that a surface of the said vertical fin subjected to an aerodynamic flow when the aircraft is in flight is modified in position and/or in surface between the returned position and the extended position so that the aerodynamic drag of the said vertical fin under given flight conditions is reduced in the returned position relative to the extended position.

To limit the aerodynamic drag generated by the fin in certain phases of flight of the aircraft, an essential part of the vertical fin surface subjected to the aerodynamic flow in flight is placed in the returned position in a zone of the flow in which the local dynamic pressure Pd is below an infinitely upstream dynamic pressure Pd0, i.e. a wake aerodynamic flow in which the local dynamic pressure Pd is modified in flight essentially by the presence of the fuselage.

In an embodiment, a reference aerodynamic surface Sv of the said vertical fin that corresponds effectively to the part of the vertical fin subjected to the aerodynamic flow:
  assumes a first value Svs in the extended position, and;
  assumes a second value Svr in the returned position; essentially lower than the first value Svs;
with Svs being a surface necessary for the critical conditions of flight at low speeds, and Svr being a surface sufficient for high-speed flight.

In an embodiment, the reference aerodynamic surface Sv is modified from the extended position toward the returned position by overlapping between an upper part and a lower part of the vertical fin movable relative to one another, with the overlapping having the effect of reducing the reference surface of the vertical fin.

In another embodiment, the reference aerodynamic surface Sv is modified from the extended position toward the returned position by overlapping a part of the vertical fin by the fuselage, with the overlapping having the effect of reducing the reference surface of the vertical fin.

A method for accomplishing the overlapping of a part of the vertical fin by the fuselage consists of moving the fin toward a position shifted toward the bottom, so that a part of the said vertical fin is within the fuselage.

Another method for accomplishing the overlapping of a part of the vertical fin by the fuselage consists of moving the vertical fin into a position tilted toward the rear around a tilt axis essentially perpendicular to the plane of symmetry of the aircraft and located near the fuselage and a leading edge of the vertical fin, so that a part of the vertical fin is within the fuselage.

Another method for implementing the invention without the need to overlap a part of the vertical fin consists of moving an essential part of the vertical fin so that in the returned position it is subjected to the reduced local dynamic pressure Pd.

Such a result is advantageously obtained by a position of the vertical fin tilted toward the rear around a tilt axis essentially perpendicular to the aircraft plane of symmetry and located near the fuselage and a leading edge of the vertical fin so that a part of the said vertical fin is behind the fuselage and in an aerodynamic wake zone of the said fuselage.

To produce such a tilt and to permit the transfer of forces from the vertical fin into the structure of the fuselage, the vertical fin is fastened to a solid fuselage frame in a rear area of the fuselage, with the tilt axis being integral with the solid frame in an upper section of the solid frame.

A tilt actuator for the vertical fin acting by modification of its length, in other words of the distance between a first extremity and a second extremity of the said actuator, is integral at the first extremity with the vertical fin at a point distant from the tilt axis, and at the second extremity with the solid frame at a point distant from the tilt axis to modify the tilt angle of the vertical fin.

To integrate a horizontal stabilizer as a function of the constraints of the vertical fin itself used by the invention, a horizontal stabilizer structure traverses the fuselage essentially horizontally, in an area located in front of the solid frame.

To assure control around a yaw axis of the aircraft regardless of the position of the vertical fin, the vertical fin has a trailing edge rudder whose extension along the length of the vertical fin is included in an area of the said vertical fin that is never covered by the fuselage, and in order not to penalize the flight control conditions at low speeds, the vertical fin advantageously has a trailing edge rudder all or part of which is included in an area of the said fin covered by the fuselage, at least in part, when the vertical fin is not in the extended position.

In order to reduce perceptibly the aerodynamic drag of the vertical fin by reducing its surface traversed by the aerodynamic flow and by increasing its slope as the case may be, the reference aerodynamic surface of the vertical fin in the returned position Svr is equal to or less than ninety percent of the reference aerodynamic surface of the vertical fin in the extended position Svs.

BRIEF DESCRIPTION OF THE DRAWINGS

The detailed description of an embodiment of the invention is given with reference to the figures, which show.

DETAILED DESCRIPTION

Figure 1:
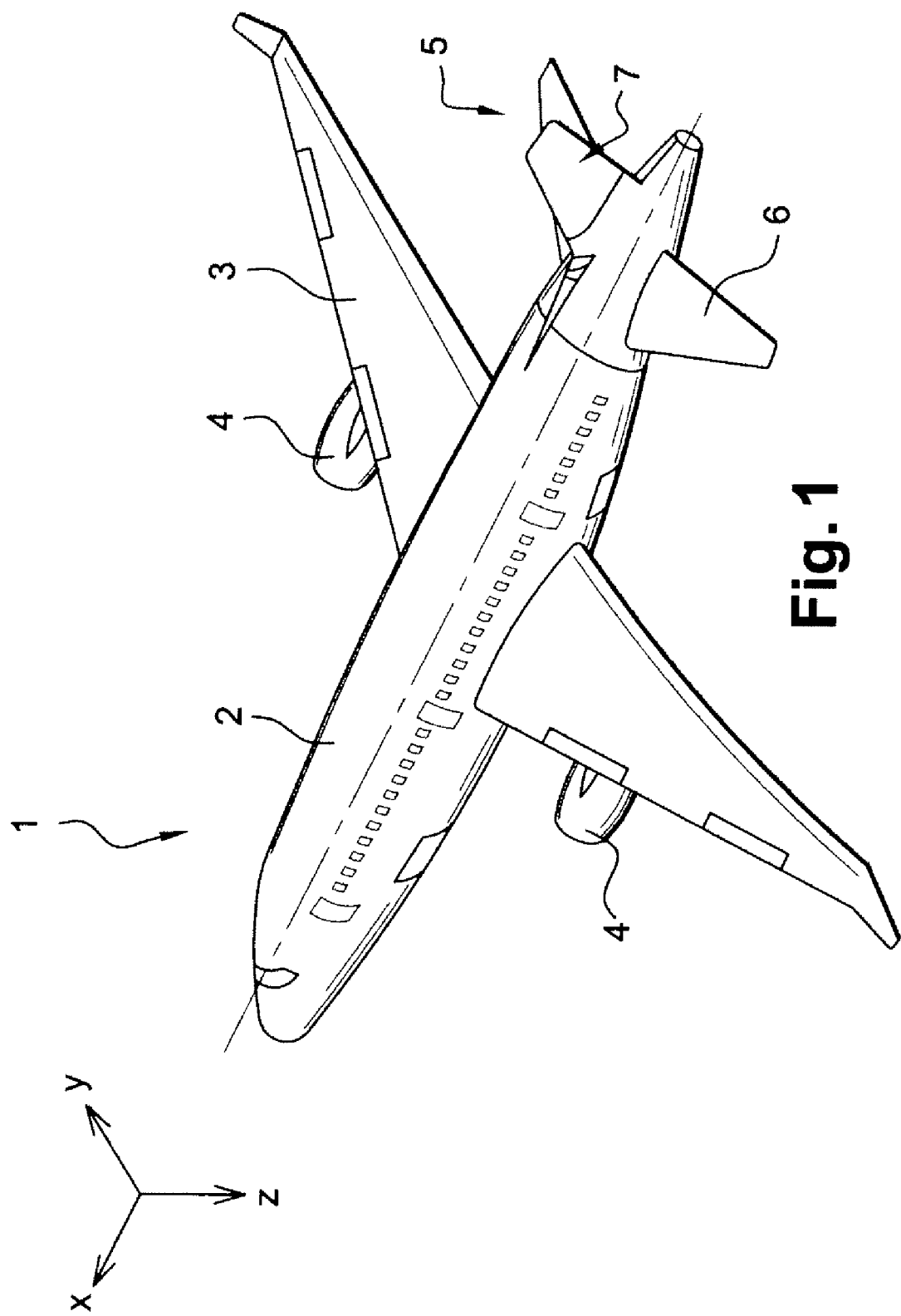
FIG. 1: a general view of an aircraft and its principal structural elements.

An aircraft 1 pursuant to the embodiment as shown in FIG. 1 has a fuselage 2, a wing 3, and a group of fins 5.

The aircraft 1 also has propulsion engines 4, two engines by way of illustration, fastened beneath the wings in the aircraft of FIG. 1.

Following the conventions used in the field of aircraft, the aircraft is associated with a frame of reference, called the aircraft frame of reference, which has a longitudinal axis X with positive orientation toward the front along the direction of motion of the aircraft in flight and essentially coincident with an axis of the fuselage 2, a vertical axis Z oriented toward the bottom of the aircraft, which determines with the X axis a vertical plane of symmetry XZ of the aircraft, and a horizontal axis Y with positive orientation toward the right of the aircraft.

The wing 3 of the aircraft 1 is fastened to the fuselage 2, and the group of fins 5, fastened to the fuselage 2 behind the wing 3, itself has a horizontal stabilizer 6 and a vertical fin 7.

Such general architecture of an aircraft is relatively conventional in the case of a transport aircraft such as a passenger or cargo transport aircraft, to which the invention is addressed.

According to one embodiment, the vertical fin 7 has movable elements that modify the apparent aerodynamic dimensions of the said vertical fin so that the aerodynamic drag of a surface, called the traversed surface, of the vertical fin 7 in contact with an aerodynamic flow when the aircraft 1 is moving relative to the air mass that surrounds it, is also modified.

Figure 2A:
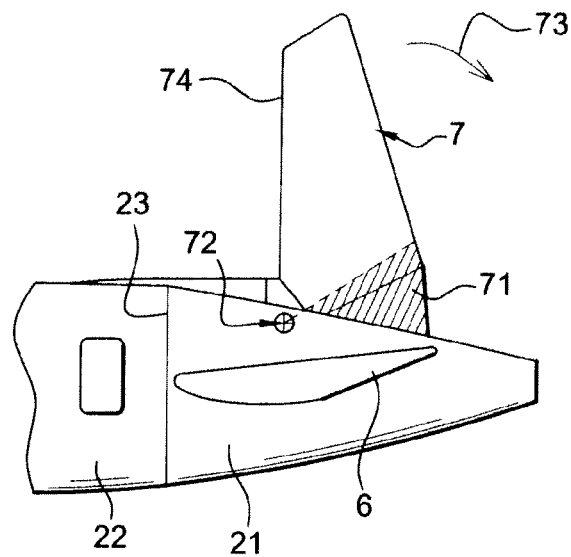
FIGS. 2a, 2b, and 2c: side views of the different positions of the vertical fin in an embodiment of the invention, the extended position in FIG. 2a, the returned position in FIG. 2c, and an intermediate position in FIG. 2b.
Figure 2B:
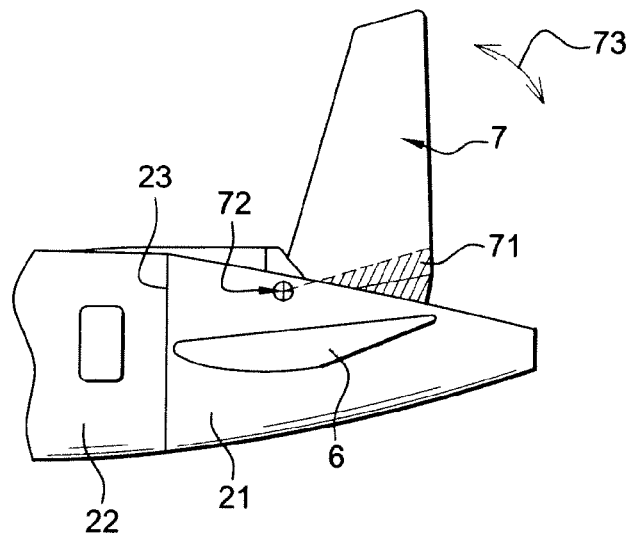
Figure 2C:
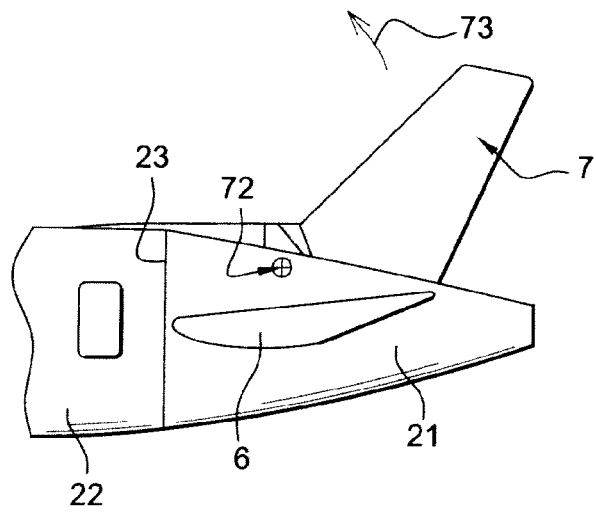

In a preferred embodiment shown in FIGS. 2a, 2b, and 2c, the vertical fin, fastened in a rear part 21 of the fuselage 2, preferably behind a pressurized part 22 of the fuselage delimited by an airtight bulkhead 23, represented by a line in FIGS. 2a to 2c, is movably mounted so that the said vertical fin is able to tilt longitudinally 73 between a forward position, FIG.

2a, and a rear position, Figure c, in which rear position a concealable area 71 of the vertical fin is inside the fuselage 2 when the fin is in the rear position, or partially inside the fuselage 2 when the fin is in an intermediate position (FIG. 2b).

The effect of the longitudinal tilting 73 is to modify an aerodynamic reference surface Sv of the vertical fin 7. Conventionally, the reference surface Sv of the vertical fin 7 is equal to the surface determined by the projection of the said vertical fin in the XZ vertical plane of symmetry of the aircraft and is located outside of the fuselage.

To a first approximation, the traversed surface of the vertical fin is essentially equal to two times its reference aerodynamic surface Sv.

The reference aerodynamic surface Sv of the vertical fun is accordingly modified between a value Svs when the vertical fin is in the position tilted toward the front, or in the extended position, and a value Svr when the vertical fin is in the position tilted toward the rear, or the returned position.

The value of the reference surface in the returned position Svr is lower than the value Svs in the extended position, with the difference in the surface corresponding to a reference aerodynamic surface represented by the concealable area 71.

The concealable area preferably represents at least ten percent of the reference surface, i.e. Svr is equal to or less than 0.9×Svs.

The concealable area 71 of the vertical fin 7 is shown hatched in FIGS. 2a and 2b for a visible sector of the said concealable area, respectively in the extended position and in an intermediate position.

The different positions of the vertical fin 7 are obtained by longitudinal tilting 73, essentially in the vertical plane of symmetry XZ of the aircraft, of the said vertical fin around a tilt axis 72 essentially parallel to the Y direction of the aircraft frame of reference.

The effect of the longitudinal tilting 73 on the one hand is to modify an inclination of a leading edge 74 of the vertical fin relative to the Z direction, or the slope of the vertical fin, and on the other hand to mask a more or less large portion of the concealable area 71 inside the rear volume 21 of the fuselage 2.

Figure 3A:
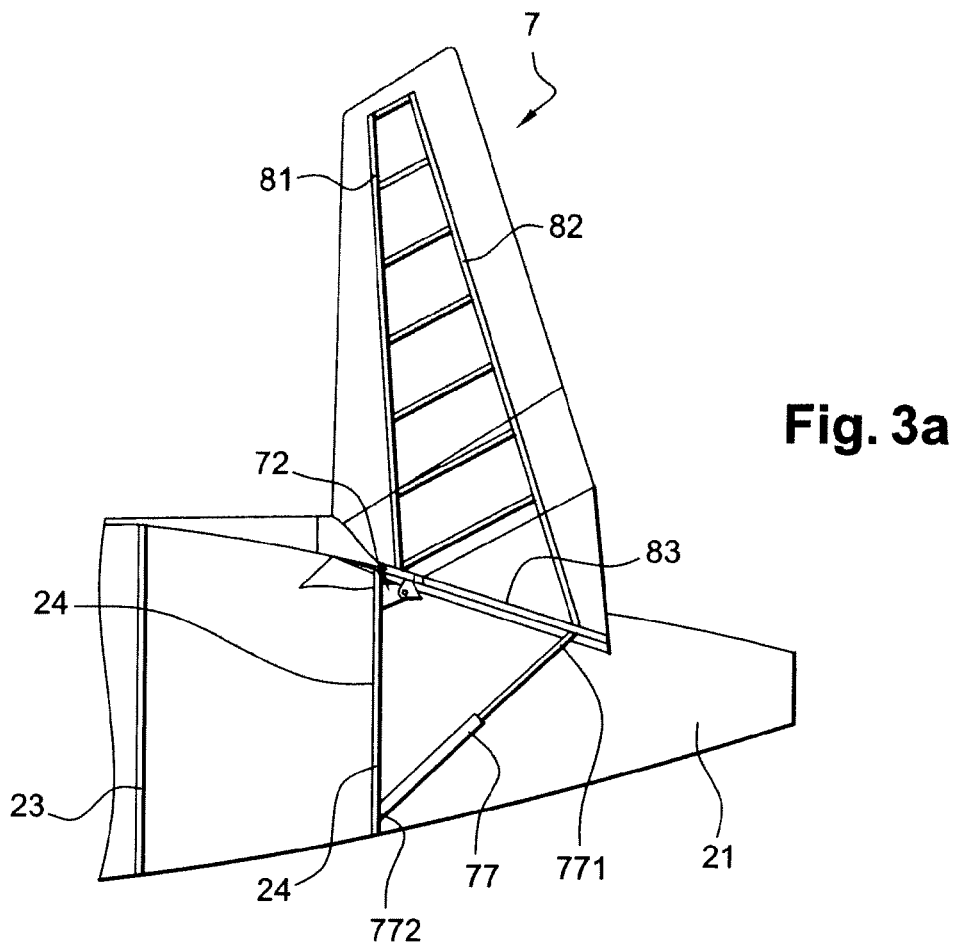
FIGS. 3a and 3b: side views of the rear part of the fuselage and of the vertical fin partially cut away in the vertical fin position when extended in FIG. 3a and when returned in FIG. 3b.
Figure 3B:
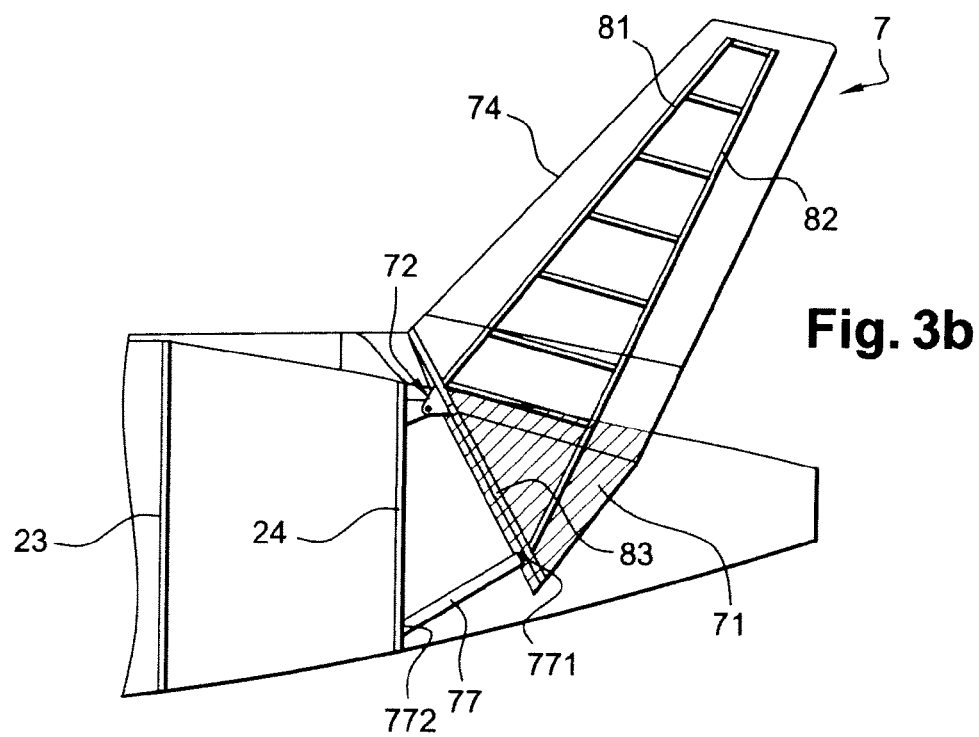

FIGS. 3a and 3b correspond to the different positions of FIGS. 2a and 2c respectively, on which the fuselage and the vertical fin are shown cut away to illustrate the principal elements that participate in implementing the invention in the embodiment presented.

Conventionally, the vertical fin 7 has a principal structure with at least one forward spar 81 and a rear spar 82, and ribs essentially perpendicular to the spars, one of which is a root rib 83.

The tilt axis 72 is located relative to the vertical fin 7 close to the root rib 83 and the forward spar 81.

The tilt axis 72 is located relative to the fuselage 2 close to the upper surface of the fuselage, for example within the volume of the fuselage in the rear section 21 of the fuselage.

A structure to reinforce the fuselage, such as a solid frame 24, is preferably made inside the fuselage 2 close to the tilt axis 72 to permit fastening supports to absorb the forces introduced into the tilt axis by the vertical fin 7.

Because of the relative positions of the tilt axis 72, the vertical fin 7, and the fuselage 2, it can be understood that tilting the vertical fin toward the rear has the effect on the one hand of increasing the slope 74 at the leading edge of the vertical fin, and on the other hand of causing the immersion of a lower rear part of the vertical fin, i.e. of the concealable area, in the rear volume of the fuselage 21.

Tilting toward the front naturally has the opposite effects on the slope and on the concealable area 71.

Aerodynamic consequences result from these two combined effects that are advantageous when the position of the vertical fin 7 is guided as a function of the flight conditions of the aircraft to best satisfy the aerodynamic constraints and the performance exigencies.

As stated in the presentation of the prior art, the vertical fin is used in an aircraft for directional control and stability requirements of the aircraft, in other words with regard to movements of the aircraft around the Z axis, called the yaw axis.

According to the invention, when the speed of the aircraft 1 is low, in particular during the takeoff phases and during the approach and landing phases, an infinitely upstream dynamic pressure Pd0 of the aerodynamic flow directly tied to the speed of the aircraft in flight being low, the fin is placed in an extended position tilted toward the front, which has the effect of increasing its reference aerodynamic surface Sv and accordingly the surface useful for generating a lateral lift along the Y direction when the aerodynamic flow forms a sideslip angle relative to the X axis of the aircraft.

In the greatest part of the flight of the aircraft, except for taxiing and low-speed flight phases of takeoff and approach/landing, the vertical fin is placed in a returned position, tilted toward the rear, which has the effect of reducing the traversed surface of the vertical fin without the reduction of the aerodynamic reference surface Sv affecting the yaw control and stability beyond the needs of the aircraft because of the elevated infinitely upstream dynamic pressure Pd0.

The reduced slope in the forward upright position of the vertical fin, a slope that is advantageously close to zero in the extreme forward position, also increases the response of the fin to a local variation of incidence and accordingly its efficacy in aerodynamic sideslip useful for the phases of reduced infinitely upstream dynamic pressure Pd0.

On the contrary, the increased slope in the inclined rear position of the vertical fin 7, besides reducing the surface traversed by the flow, a source of aerodynamic frictional drag, also reduces the relative thickness of the aerodynamic profiles of the vertical fin, which has the effect of reducing a form aerodynamic drag of the said vertical fin.

Accordingly, it is possible to determine the useful dimensions of the vertical fin for the unfavorable case of situations in which the dynamic pressure is low and to reduce these dimensions by tilting the fin toward the rear, toward a returned position, when the dynamic pressure is higher, and thus to reduce the aerodynamic drag when the flight conditions do not require fin efficacy as great as at low speed.

To modify the position of the vertical fin 7, an actuator 77, for example a screw jack whose length is adjusted by controls not shown, modifies the distance between a point on the vertical fin 7 distant from the tilt axis 72, for example a point 771 located close to the rear spar 82 and the root rib 83 to benefit from a good structural behavior of the vertical fin, and a point on the structure of the fuselage distant from the tilt axis 72, for example a point 772 to absorb the forces from the actuator 77 located in the lower part of the solid frame 24.

It can be understood from the operation that has just been described that the modification of the position of the vertical fin 7 is accomplished depending on the phases of flight and/or on a parameter such as the dynamic pressure that is known on board an aircraft from conventional measurements, for example a central anemometer, and that this modification does not require an elevated dynamic.

In practice, the change of position between the extreme extended and returned positions of the vertical fin 7 can be accomplished over a period of several seconds or tens of seconds, and accordingly does not require a rapid actuator. The actuator 77 is advantageously an actuator of the "ball screw" type driven by hydraulic motors and/or electric motors that have the advantage of being able to be designed with high reliability and of irreversible operation, which guarantees that the vertical fin remains fixed if the said motors are not powered, in particular in the stable returned and extended positions.

Figure 5:
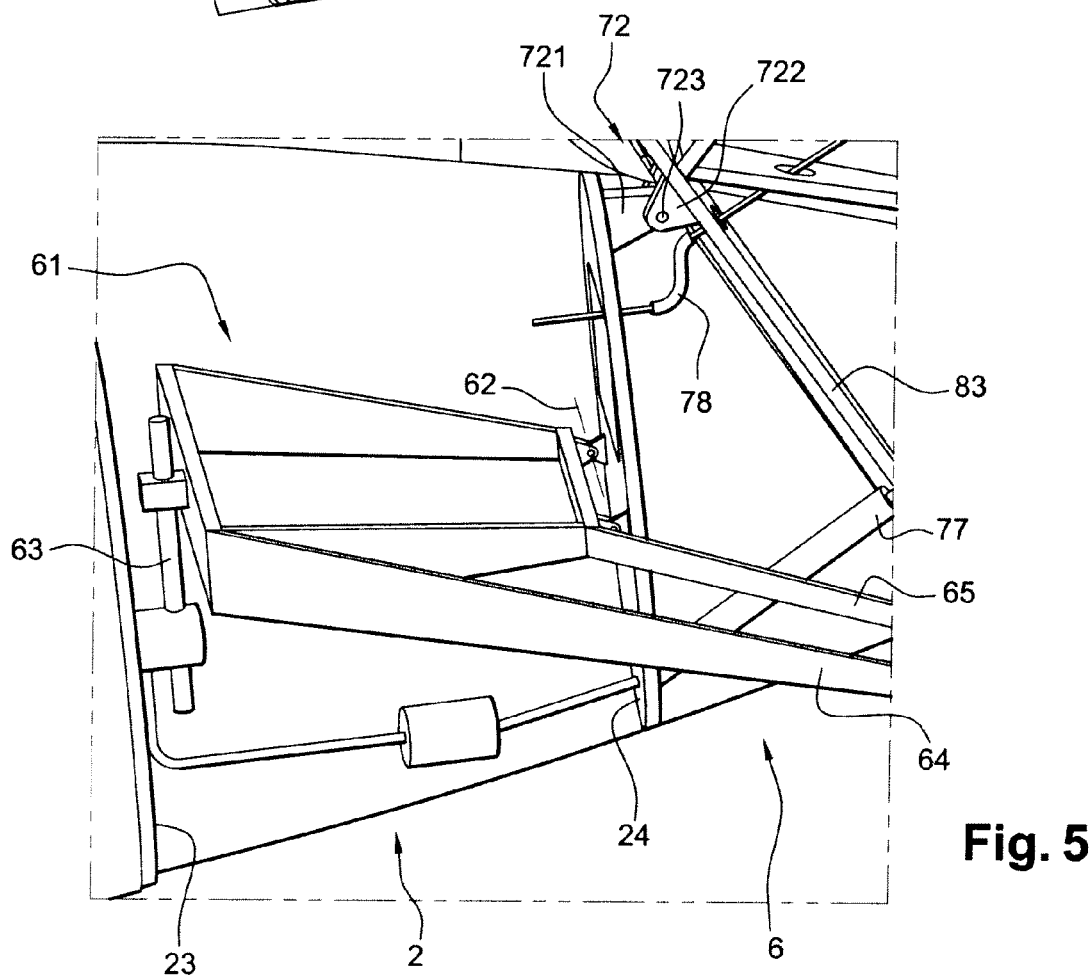
FIG. 5: a cutaway perspective view of the rear part of the fuselage showing the principles of mounting the vertical fin at its position and of the horizontal stabilizer.

To respond to the safety exigencies, the structure associated with the tilt axis 72, supports 721 fixed on the solid frame, supports 772 movable on the vertical fin and tilt shaft 723, visible in FIG. 5, as well as the solid frame 24 are preferably designed with redundancies for a design called "fail-safe" in which the forces are able to be transmitted along two or more different paths to assure the integrity of the structure in case of the failure of a structural element.

For the needs for controlling the motions of the aircraft around the yaw axis, the vertical fin 7, besides a fixed keel, has at least one directional rudder 76, i.e. a movable aerodynamic surface hinged to a rear edge or trailing edge of the vertical fin 7.

According to the embodiment described, the front and rear spars 81, 82 and the ribs including the root rib 83 already mentioned, are elements of the structure of the keel, fixed except for tilting motions 73 of the vertical fin 7.

The directional rudder 76 hinged to the rear spar 83 extends along the length of the vertical fin, i.e. between the root 83 at the fuselage and a free extremity 75 opposite the fuselage.

Figure 4:
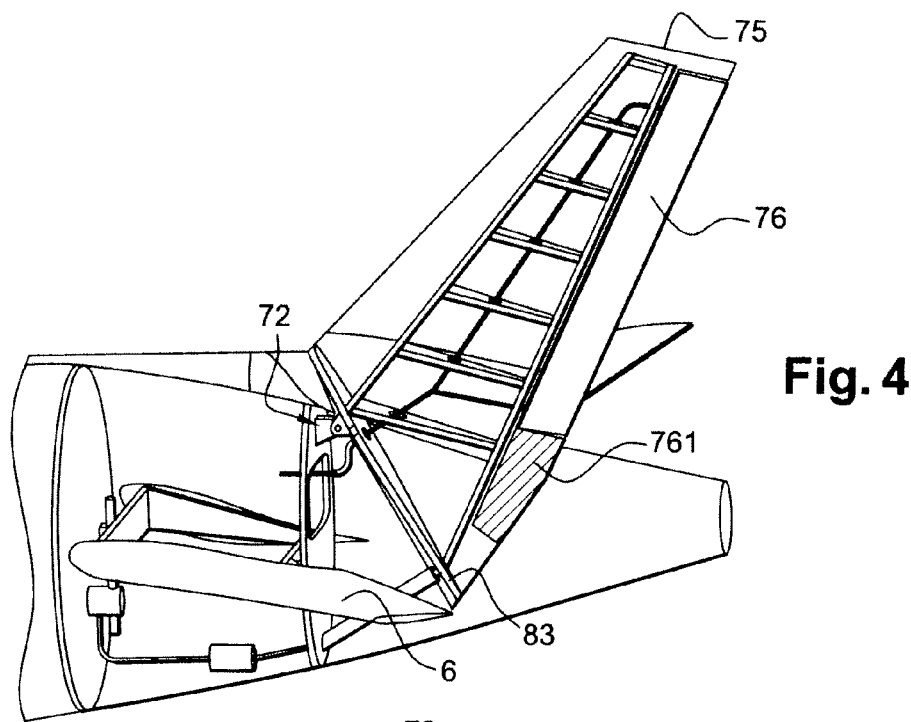
FIG. 4: a cutaway perspective view of the rear part of the fuselage showing the vertical fin and the horizontal stabilizer.

To avoid interference between the fuselage structure 2 and the hinged rudder 76, the extension of the said rudder from the fuselage end is limited so that in the returned position of the vertical fin 7, the rudder 76 remains permanently in an area of the vertical fin outside of the fuselage, as illustrated in FIG. 4, regardless of its setting, at least its setting permitted in the returned position of the vertical fin 7.

The hinged rudder 76 can be in a single section or in two or more hinged sections spread along the length of the vertical fin 7.

The vertical fin 7 advantageously has at least one second directional rudder 761 in the part of it closest to the fuselage 2 that corresponds essentially at the trailing edge to the concealable area 71 of the vertical fin 7.

The said second directional rudder 761 is active when the vertical fin 7 is in an extended position and it is possible to set the said second rudder without mechanical interference with the fuselage, which permits increasing the total active surface of rudders in the low-speed configuration.

The second rudder 761 is inactive in a returned or intermediate position of the vertical fin 7 in which the said rudder is completely or partly inside the fuselage, which is not disadvantageous because of the associated flight conditions that do not require as large a rudder surface as that for control at low speeds.

Because of the interior volumes at the fuselage 2 occupied by the vertical fin 7 when the said vertical fin is in the returned position, it is necessary to provide for a special arrangement of the horizontal stabilizer 6.

As shown in FIGS. 4 and 5, the horizontal stabilizer 6 has a joining structure 61 traversing the fuselage that joins the exterior parts of the said horizontal stabilizer to the fuselage 2, and to adapt an angular position of the horizontal stabilizer 6 to the flight conditions of the aircraft, the said joining structure is movable in rotation around a horizontal axis 62 parallel to the Y direction, following a known design.

In the described embodiment the solid frame 24 is advantageously located behind the airtight frame 23 so that the interior space of the fuselage 2 between the said solid and airtight frames is sufficient to permit the desired passage and motions of the joining structure 61.

The joining structure 61 is advantageously mounted hinged 62 on one of the frames, solid or airtight, for example the solid frame 24 as in the figures, and an actuator 63 resting on the other frame, the airtight frame 23 in the example, acts on the joining structure 61 to set the horizontal stabilizer 6 into rotation and to modify the angular position of the said horizontal stabilizer, shown in FIG. 5 very schematically by the volumes of front spars 64 and rear spars 65 of the said horizontal stabilizer.

The use of the solid 24 and airtight 23 frames is only one advantageous example for the installation of the horizontal stabilizer, and other assemblies are possible, for example by means of specific frames in front of the solid frame 24, or using a horizontal frame in front of the wing 3, called a cheater fin (solutions not shown), in a volume of the fuselage that guarantees the absence of mechanical interference with the motions of the vertical fin 7.

As shown in FIG. 5, conduits or cables 78 to go between the vertical fin 7 and the fuselage are provided with hinged or flexible sections that permit the possible motions of the vertical fin 7. Such hinged or flexible sections are preferably provided on the conduits or cable close to the tilt axis 72 of the vertical fin to limit the excursions of these assemblies.

The conduits or cables, for example, are hydraulic conduits for servocontrol of rudders, fluid drainage conduits, electric power cables or control or measurement system cables, or any other system installed in the vertical fin 7.

To limit the parasitic aerodynamic drags that might be generated by open spaces between the vertical fin 7 and the fuselage 2, considering the motions of the vertical fin, movable covers are provided in the locations on the fuselage uncovered when the vertical fin 7 assumes certain positions, to mask the openings that would be formed in the absence of such movable covers.

Figure 6A:
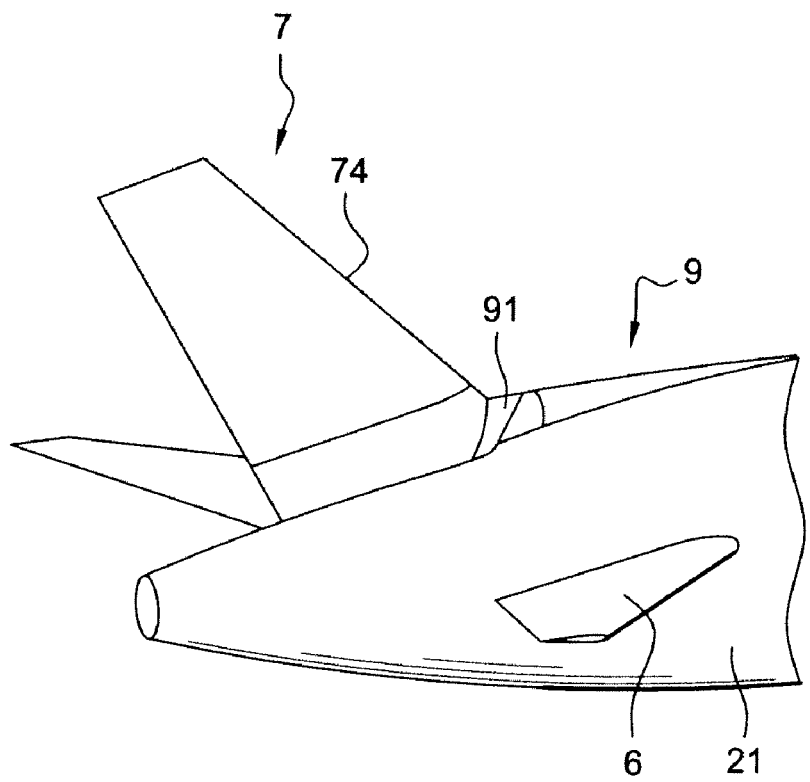
FIGS. 6a and 6b: perspective views of the rear part of the fuselage showing the operation of a movable cover for the openings at the junction between the vertical fin and an angle rafter, with the vertical fin returned in FIG. 6a and vertical fin extended in FIG. 6b.
Figure 6B:
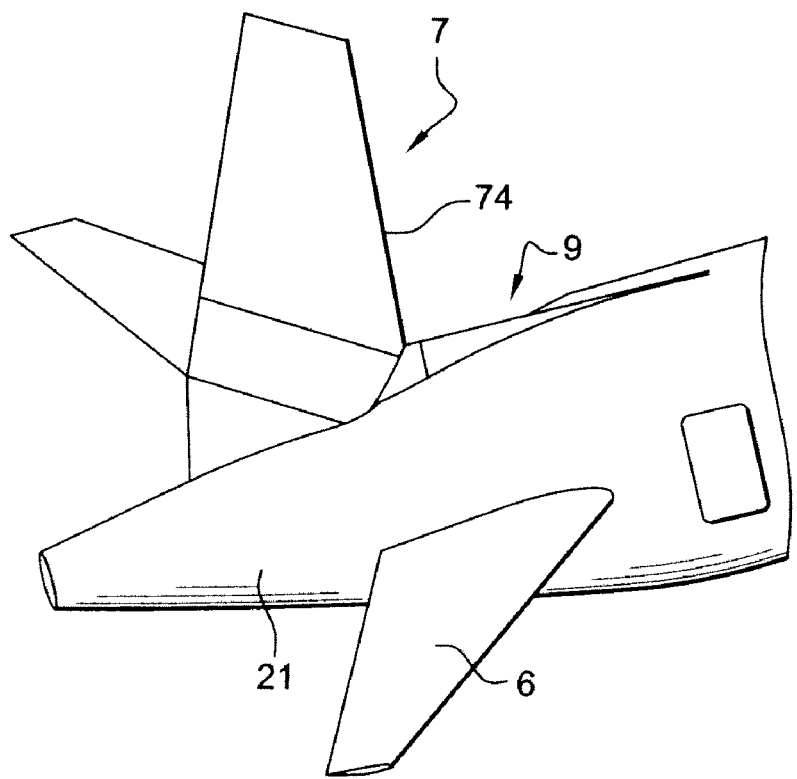

In particular, as shown in FIGS. 6a and 6b, the leading edge 74 of the vertical fin 7 is subject to displacement in the X direction, toward the front, when the vertical fin is moved toward the extended position, and toward the rear when the vertical fin is moved toward the returned position or an intermediate position.

To mask the openings induced by the motion of the leading edge 74 at the fuselage 2, or as shown in FIGS. 6a and 6b at an angle rafter 9 located above the fuselage 2 in extension toward the front of the vertical fin 7, a movable closing element 91, called a movable cover, is provided in the area of the openings.

The movable cover 91 assumes a first position, called the concealed position, as shown in FIG. 6b, when the vertical fin is in the extended position and the forms of the angle rafter 9 and of the leading edge 74 of the vertical fin assure aerodynamic continuity of the exterior surface of the aircraft in this area.

The movable cover 91 assumes positions, called occlusion positions, as shown in FIG. 6a, when the vertical fin is in the returned position or in a position intermediate between the extended position and the returned position, in order to block the openings between the angle rafter and the vertical fin.

In an embodiment, the movable cover 91 is kept in contact by elastic means, for example a spring strut, not shown, against the leading edge 74 of the vertical fin, and is moved between the concealed and occlusion positions under the effect of the displacement of the vertical fin.

In another embodiment, the position of the movable fin 91 is modified by means of an actuator, not shown, the action of which is controlled by the position of the vertical fin.

The proposed embodiment of the invention does not limit the embodiments of the invention.

In particular, other means are possible for adapting the surface of a vertical fin depending on the phase of flight and on the dynamic pressure, to limit the aerodynamic drag in the phases of flight for which a sufficient surface of the vertical fin is less than that necessary for critical phases of flight.

Thus, in an embodiment of the invention not shown, the fin is movable relative to the fuselage according to an essentially vertical displacement in the Z direction.

In this embodiment, the tilting motion around a tilt axis is replaced by a translational motion, for example along slide bars provided vertically to the rear of a solid frame that absorbs the forces from the vertical fin.

Thus, in a high position, the vertical fin presents a maximum reference aerodynamic surface Svs, and in a low position, part of the vertical fin is inside the rear fuselage and the vertical fin presents a reduced reference aerodynamic surface Svr, without changing the slope at all.

In another embodiment not shown, an upper part of the vertical fin is made movable vertically relative to a lower part that is fixed in relation to the fuselage.

The upper part is arranged in the high part of the lower part, to penetrate into the lower part in the course of an essentially vertical motion, or so that the lower part penetrates into the upper part.

In a high position of the upper part, the vertical fin presents a maximum reference aerodynamic surface Svs, and in a low position of the said upper part, the vertical fin presents a reduced reference aerodynamic surface Svr, because of the more or less partial covering of the high and low parts of the vertical fin, without modifying the slope at all.

In the examples of embodiment just described, the aerodynamic drag of the vertical fin 7 is reduced equally in the returned positions, when a part of the surface of the said vertical fin located in a zone of reduced local dynamic pressure Pd is increased, to the detriment of a portion of the surface that remains subject to the aerodynamic flow essentially at the infinitely upstream dynamic pressure Pd0.

Actually, it is known that the local dynamic pressure Pd of the aerodynamic flow is reduced locally relative to the dynamic pressure Pd0 of the infinitely upstream aerodynamic flow, in an area 11a of the boundary layer close to the wall of the fuselage 2, a boundary layer whose thickness is practically maximum on a fuselage in the rear part of the said fuselage, and to the rear of the fuselage 2 in its wake zone.

Figure 7A:
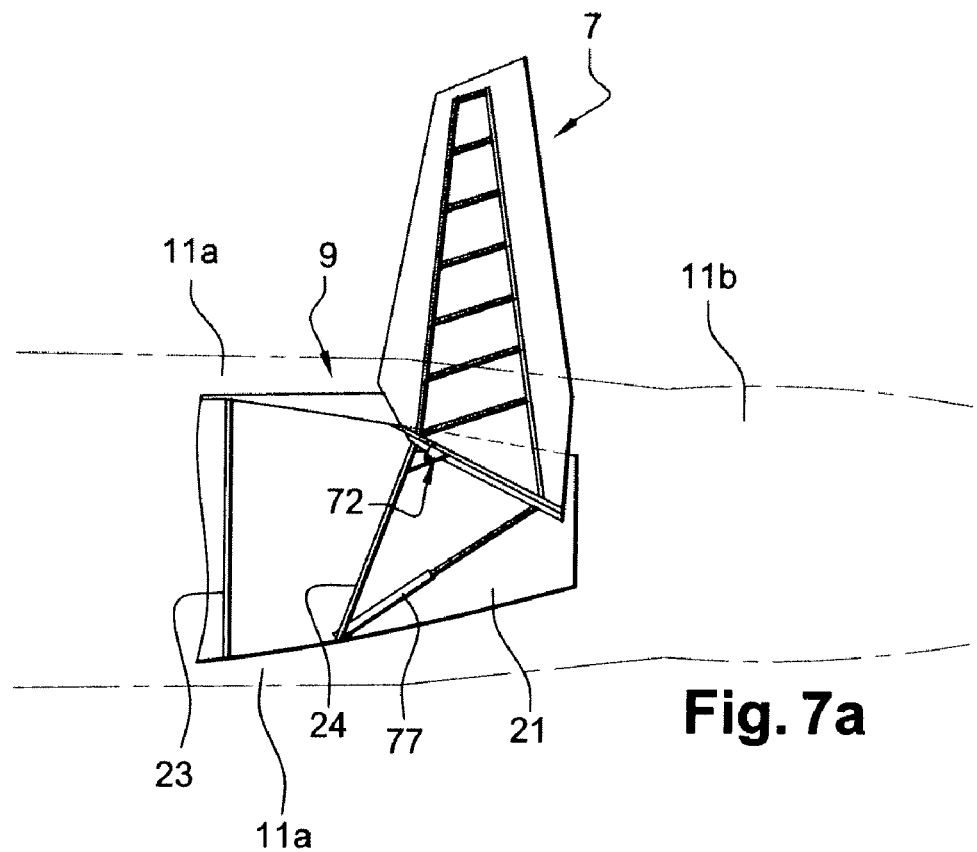
FIGS. 7a and 7b: illustrations of an embodiment of the invention in side views of the rear part of the fuselage and of the vertical fin partially cut away in the extended position of the vertical fin in FIG. 7a and with the vertical fin returned in FIG. 7b.
Figure 7B:
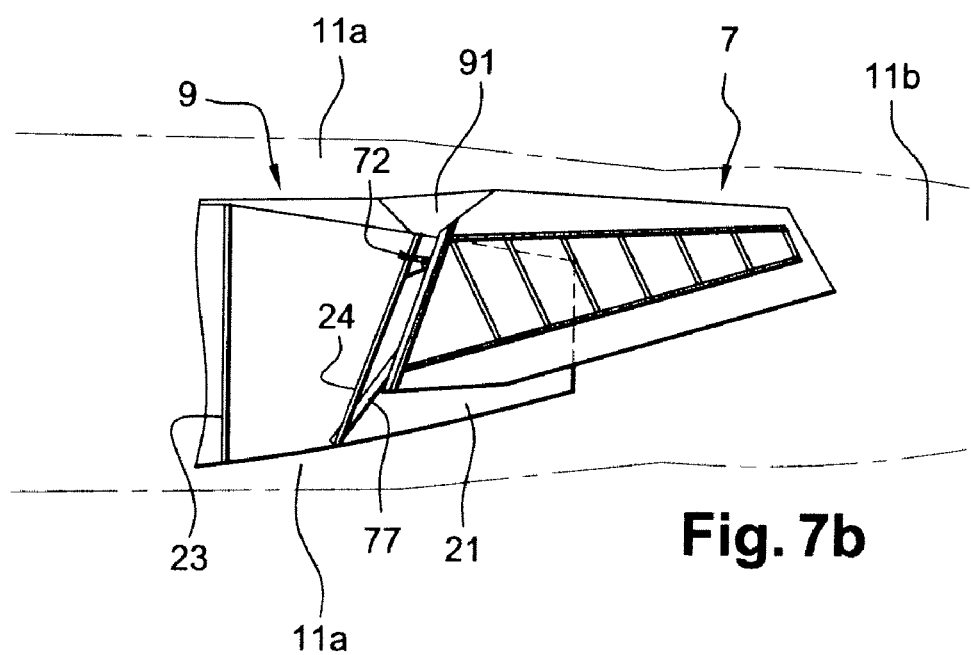

In an embodiment of the invention shown schematically in FIGS. 7a and 7b, this known phenomenon is exploited to the maximum to reduce the aerodynamic drag of the vertical fin 7, by giving the said vertical fin a position in which a significant portion, or as in the illustrated mode, all of the useful surface of the vertical fin 7 is positioned in an aerodynamic flow of locally reduced dynamic pressure Pd.

To achieve this result, the vertical fin 7 is fastened to the fuselage 2 so as to assume positions that are more or less tilted longitudinally in a manner similar to the mode described above, but with the special feature of presenting a position of maximum tilt to the rear such that the corresponding tilt angle positions all of the vertical fin 7, or at least an essential portion of the said vertical fin, in the flow around the fuselage or behind it, the local dynamic pressure Pd of which is reduced, as FIG. 7b shows.

The inclination is obtained, for example, by using a principle similar to that used in the preceding example shown on FIGS. 3a and 3b, but with a possibility of tilting the vertical fin 7 more toward the returned position, i.e. toward the rear.

In this embodiment, the vertical fin 7 is advantageously fastened to the rear fuselage 21 in a position closer to the rear extremity of the fuselage 2, and the solid frame 24, for example, is tilted so that its lower part is in the fuselage more toward the front than its upper part, to free up the volumes in the fuselage necessary for tilting the vertical fin 7 and for the tilt actuators 77.

In the extreme returned position proposed in the embodiment of FIG. 7b, advantageously for reducing the aerodynamic drag, it is ineffective to use the vertical fin leading edge rudder(s) to produce an aircraft yaw control torque.

In practice, however, this situation is not critical since because of the relatively high dynamic pressure during the phases of flight of the aircraft during which such a fin position is used, the value of the directional stability coefficient $Cn\beta$ is sufficient to keep the aircraft in an acceptable flight domain in case of engine failure, and the fin can then be tilted a posteriori toward the front to improve the ease of piloting the aircraft.

The aspects of the disclosed embodiments accordingly permit reducing the aerodynamic drag of an aircraft in certain phases of flight, in particular during the cruising phases of flight that make up most of the flying time of an aircraft, without modifying control performance during low-speed phases of flight.

The invention claimed is:

1. An aircraft that has a fuselage with a shape elongated along a longitudinal direction X of an aircraft frame of reference, with a vertical fin fastened to the fuselage in a rear section of the fuselage relative to the direction of motion of the aircraft in flight and above the fuselage, substantially in a vertical plane of symmetry of the aircraft, wherein the vertical fin has at least two stable positions, an extended position and a returned position, such that a surface of the vertical fin, subjected to an aerodynamic flow when the aircraft is in flight, is modified in at least one of position and surface area between the returned position and the extended position, so that the aerodynamic drag of the vertical fin under given flight conditions is reduced in the returned position relative to the extended position, and wherein the vertical fin comprises a first and second trailing edge rudder.

2. The aircraft according to claim 1 in which a substantial portion of the surface of the vertical fin subjected to the aerodynamic flow in flight is placed in the returned position in a zone with a local dynamic pressure Pd lower than an infinitely upstream dynamic pressure Pd0, with said aerodynamic flow with local dynamic pressure Pd corresponding to a flow perturbed in flight substantially by the fuselage.

3. The aircraft according to claim 2 wherein the essential portion of the vertical fin subject to a reduced local dynamic pressure Pd in the returned position is subjected to said local dynamic pressure Pd by a position of the vertical fin tilted toward the rear around a tilt axis substantially perpendicular to the aircraft plane of symmetry and located near the fuselage and a leading edge of the vertical fin, so that a portion of said vertical fin is behind the fuselage and in an aerodynamic wake zone of the fuselage.

4. The aircraft according to claim 1 wherein a reference aerodynamic surface Sv of the vertical fin, comprises a reference surface effectively subjected to the aerodynamic flow:

assumes a first value Svs in the extended position, and assumes a second value Svr in the returned position that is lower than the first value Svs.

5. The aircraft according to claim 4 wherein the reference aerodynamic surface Sv is modified from the extended position toward the returned position by a portion of the vertical fin being covered by the fuselage.

6. The aircraft according to claim 5 wherein the covering of a portion of the vertical fin by the fuselage is obtained by a position of the vertical fin displaced downward so that a portion of the vertical fin is located inside the fuselage.

7. The aircraft according to claim 5 wherein the covering of a portion of the vertical fin by the fuselage is obtained by a position of the vertical fin tilted toward the rear around a tilt axis substantially perpendicular to the aircraft plane of symmetry and located near the fuselage and a leading edge of the vertical fin so that a portion of the vertical fin is inside the fuselage.

8. The aircraft according to claim 7 further comprising a solid fuselage frame in a rear area of the fuselage to which the vertical fin is fastened, and in which the tilt axis is integral with the solid frame in an upper part of the solid frame and in which an actuator for tilting the vertical fin, acting by modification of the distance between a first extremity and a second extremity of the actuator, is integral with the first extremity of the vertical fin at a point distant from the tilt axis and with the second extremity of the solid frame at a point distant from the tilt axis.

9. The aircraft according to claim 8 wherein a structure of a horizontal stabilizer traverses the fuselage, substantially horizontally, in an area located in front of the solid frame.

10. The aircraft according to claim 5 wherein the first trailing edge rudder extends along a length of the vertical fin in an area of the vertical fin that is never covered by the fuselage.

11. The aircraft according to claim 4 in which the reference aerodynamic surface of the vertical fin in the returned position Svr is equal to or smaller than ninety percent of the reference aerodynamic surface of the vertical fin in the extended position Svs.

12. The aircraft according to claim 1 in which one of the first or second trailing edge rudder is at least partially concealed in relation to the aerodynamic flow when the vertical fin is in the returned position.

13. The aircraft according to claim 1 in which one of the first or second trailing edge rudder is inactive when the vertical fin is in the returned position.

* * * * *